United States Patent
Cho et al.

(10) Patent No.: US 8,532,044 B2
(45) Date of Patent: Sep. 10, 2013

(54) METHOD FOR FEEDBACK TO UPLINK ALLOCATION REQUEST

(75) Inventors: Hee Jeong Cho, Anyang-si (KR); Ki Seon Ryu, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 259 days.

(21) Appl. No.: 13/057,452

(22) PCT Filed: Sep. 4, 2009

(86) PCT No.: PCT/KR2009/005001
§ 371 (c)(1),
(2), (4) Date: Feb. 3, 2011

(87) PCT Pub. No.: WO2010/027207
PCT Pub. Date: Mar. 11, 2010

(65) Prior Publication Data
US 2011/0141997 A1      Jun. 16, 2011

(30) Foreign Application Priority Data

Sep. 4, 2008  (KR) .................. 10-2008-0087290
Nov. 4, 2008  (KR) .................. 10-2008-0108713

(51) Int. Cl.
*H04W 4/00* (2009.01)

(52) U.S. Cl.
USPC ........................................ 370/329; 455/450

(58) Field of Classification Search
None
See application file for complete search history.

(56) References Cited

U.S. PATENT DOCUMENTS

2008/0159427 A1      7/2008  Kang et al.
2009/0274041 A1*    11/2009  Chou et al. .................... 370/216

FOREIGN PATENT DOCUMENTS

| KR | 10-2006-0110950 | 10/2006 |
| KR | 10-2007-0079511 | 8/2007 |
| KR | 10-2008-0054987 | 6/2008 |

* cited by examiner

*Primary Examiner* — Chi Pham
*Assistant Examiner* — Mohammad Adhami
(74) *Attorney, Agent, or Firm* — Lee, Hong, Degerman, Kang & Waimey (57) ABSTRACT

A method for a feedback to an uplink allocation request is disclosed. The method for a feedback to an uplink allocation request comprises receiving a bandwidth request (BR) of the mobile station in a base station; detecting codes from the bandwidth request; and transmitting a BR result report to a mobile station, the BR result report indicating detection failure when detecting the codes or code repetition. According to the embodiment of the present invention, it is advantageous in that a wait time of a timer can be reduced as the base station directly reports the result of the bandwidth request or the mobile station to the mobile station, whereby retransmission of the bandwidth request can be performed promptly.

6 Claims, 8 Drawing Sheets

METHOD FOR FEEDBACK TO UPLINK ALLOCATION REQUEST

CROSS-REFERENCE TO RELATED APPLICATIONS

This application is the National Stage filing under 35 U.S.C. 371 of International Application No. PCT/KR2009/005001, filed on Sep. 4, 2009, which claims the benefit of earlier filing date and right of priority to Korean Application Nos. 10-2008-0108713, filed on Nov. 4, 2008, and 10-2008-0087290, filed on Sep. 4, 2008, the contents of all of which are incorporated by reference herein in their entireties.

TECHNICAL FIELD

The present invention relates to resource allocation of a broadband wireless access system, and more particularly, to a method of transferring a result of an allocation request transmitted to obtain uplink resources.

BACKGROUND ART

Figure 1:
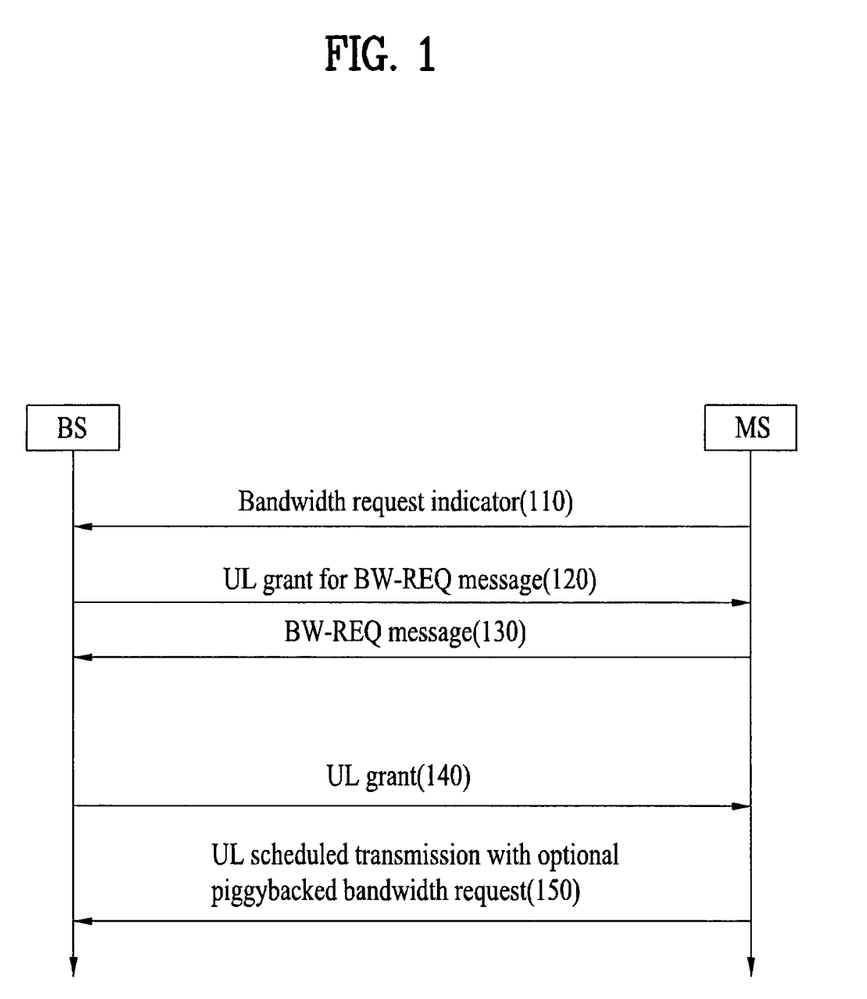
FIG. 1 is a diagram illustrating an example of a procedure of requesting an uplink bandwidth from a mobile station in a broadband wireless access system.

In a broadband wireless access system, a mobile station can request an uplink bandwidth in accordance with a random access mode of FIG. 1. A base station simultaneously supports a general five-step mode 110 to 150 and a three-step mode 110, 140 and 150 corresponding to a fast access mode. The five-step mode can be used independently from the three-step mode, and can substitute for the three-step mode.

In case of the three-step mode, the mobile station transmits a bandwidth request indicator including uplink bandwidth request information (MS ID, request size, etc.) (110). The base station which has received the indicator from the mobile station allocates uplink resources to the mobile station (140). The mobile station transmits data through the allocated region (150). At this time, the mobile station can transmit additional uplink bandwidth request information.

In case of the five-step mode, the mobile station transmits a bandwidth request indicator (110). The base station which has received the indicator from the mobile station allocates uplink resources for transmitting a bandwidth request (BW-REQ) message to the mobile station (120). The mobile station transmits the bandwidth request (BW-REQ) message through the allocated region (130). The base station which has received the bandwidth request (BW-REQ) message from the mobile station allocates uplink resources to the mobile station (140). The mobile station transmits data through the allocated region (150). At this time, the mobile station can transmit additional uplink bandwidth request information.

In the broadband wireless access system according to the related art, after transmitting the bandwidth request indicator, the mobile station cannot predict whether the bandwidth request indicator has normally been transmitted to the base station or whether the used code has been repeated, until the mobile station receives an uplink grant message or a contention-based reservation timer of the mobile station reaches time-out. Accordingly, if the mobile station does not receive any uplink grant message until the corresponding timer ends, the mobile station retransmits the bandwidth request indicator. Namely, in the broadband wireless access system according to the related art, the mobile station has no option but to wait without taking any action until the corresponding timer ends. In view of the mobile station intended to request a bandwidth of an uplink to transmit real-time traffic, such a wait time is too long and may be regarded as the unnecessary.

DISCLOSURE

Technical Problem

Accordingly, the present invention has been devised to obviate one or more problems due to limitations and disadvantages of the related art, and an object of the present invention is to provide a method for a feedback to uplink allocation request, in which a base station reports a result of bandwidth requests received from a mobile station to the mobile station, so that the mobile station takes an action suitable for the result.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

To achieve these objects and other advantages and in accordance with the purpose of the invention, as embodied and broadly described herein, according to one embodiment of the present invention, a method for a feedback to an uplink allocation request in reporting a result of an uplink allocation request of a mobile station from a base station to the mobile station comprises receiving a bandwidth request (BR) of the mobile station in the base station; detecting codes from the bandwidth request; and transmitting a BR result report to the mobile station, the BR result report indicating detection failure when detecting the codes or code repetition.

Preferably, the step of detecting codes includes decoding information of the bandwidth request if the codes are successfully detected from the received bandwidth request.

Preferably, the step of detecting codes includes detecting codes of the received bandwidth request for each resource unit. At this time, the step of transmitting the BR result report includes transmitting a code report including codes where code detection has been failed or code repetition has occurred and a resource unit report indicating a resource unit failed in detection.

Preferably, the BR result report is included in a message broadcasted to a plurality of mobile stations.

To achieve these objects and other advantages and in accordance with the purpose of the invention, as embodied and broadly described herein, according to another embodiment of the present invention, a method for a feedback to an uplink allocation request in reporting a result of an uplink allocation request of a mobile station from a base station to the mobile station comprises receiving a bandwidth request (BR) of the mobile station in the base station; detecting codes from the bandwidth request; and transmitting a BR result report to the mobile station, the BR result report indicating successfully detected codes.

Preferably, the step of detecting codes includes detecting codes of the received bandwidth request for each resource unit. At this time, the step of transmitting the BR result report includes transmitting a bit map to the mobile station, the bit map indicating codes successfully detected for each resource unit.

Preferably, the BR result report is included in broadcast messages transmitted at a certain subframe interval.

Preferably, the BR result report is transmitted prior to an uplink grant message of the mobile station.

To achieve these objects and other advantages and in accordance with the purpose of the invention, as embodied and broadly described herein, according to still embodiment of the present invention, a method for receiving feedback to an uplink allocation request in receiving a result of an uplink allocation request from a base station comprises transmitting a bandwidth request (BR) from a mobile station to the base station; receiving a BR result report from the base station, the BR result report indicating detection failure when detecting codes from the bandwidth request or code repetition; and retransmitting the bandwidth request if it is identified from the BR result report that codes of the mobile station are those failed in the detection or repeated codes.

To achieve these objects and other advantages and in accordance with the purpose of the invention, as embodied and broadly described herein, according to further still another embodiment of the present invention, a method for receiving a feedback to an uplink allocation request in receiving a result of an uplink allocation request from a base station comprises transmitting a bandwidth request (BR) from a mobile station to the base station; receiving a BR result report from the base station, the BR result report indicating codes successfully detected when detecting codes from the bandwidth request; and retransmitting the bandwidth request if it is identified from the BR result report that codes of the mobile station are not the successfully detected codes.

Preferably, the BR result report is a bit map indicating codes successfully detected for each resource unit.

Advantageous Effects

According to the embodiments of the present invention, it is advantageous in that a wait time of a timer can be reduced as the base station directly reports the result of the bandwidth request of the mobile station to the mobile station, whereby retransmission of the bandwidth request can be performed promptly.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings:

FIG. 4b is a diagram illustrating an example of reporting mobile station information in FIG. 4a;

BEST MODE

Reference will now be made in detail to the preferred embodiments of the present invention, examples of which are illustrated in the accompanying drawings. It is to be understood that various modifications can be made in the embodiments of the present invention, and the scope of the present invention is not limited to the following embodiments of the present invention.

According to one embodiment of the present invention, there is provided a method of reporting a result of a code detection procedure from a base station to a mobile station. Problems that may occur in the code detection procedure are as follows.

First of all, a problem occurs in that a code is repeatedly used. Namely, it means that two or more users use the same code at the same time. Next, a problem occurs in that mis-detection is caused by interference. In this case, the base station fails to detect any code.

The base station performs a failure case of the code detection result or performs a success case to report the result to the mobile station.

According to the failure case report, if it is determined that a code used in a specific resource unit is repeated, the base station transmits a corresponding resource unit number and code information to the mobile station. The mobile station retries a bandwidth request if its code is identical with the corresponding information of the failure case report.

Furthermore, in case of the failure case, if it is determined that the code is mis-detected by the corresponding resource unit due to interference, the base station transmits the corresponding resource unit number and invalid code information to the mobile station, whereby all the mobile stations which have tried a bandwidth request for the corresponding resource unit retry the bandwidth request (i.e., code transmission).

At the time when a service (for example, rtPS) having a periodical data transmission flow should be requested, if a request of the corresponding service is not recognized by the base station, the base station transmits information (MS-ID, STID or Flow-ID, etc.) of a corresponding mobile station, whereby the corresponding mobile station retries the bandwidth request.

Meanwhile, according to the success case report, the base station successfully performs code detection and then transmits code information to each resource unit that does not belong to the failure case. The code information can be transmitted in a bitmap type. In this case, the mobile station, which does not belong to the success case of the success case report, identifies that its code has not been transmitted to the resource unit properly, and retransmits the bandwidth request.

Figure 2:
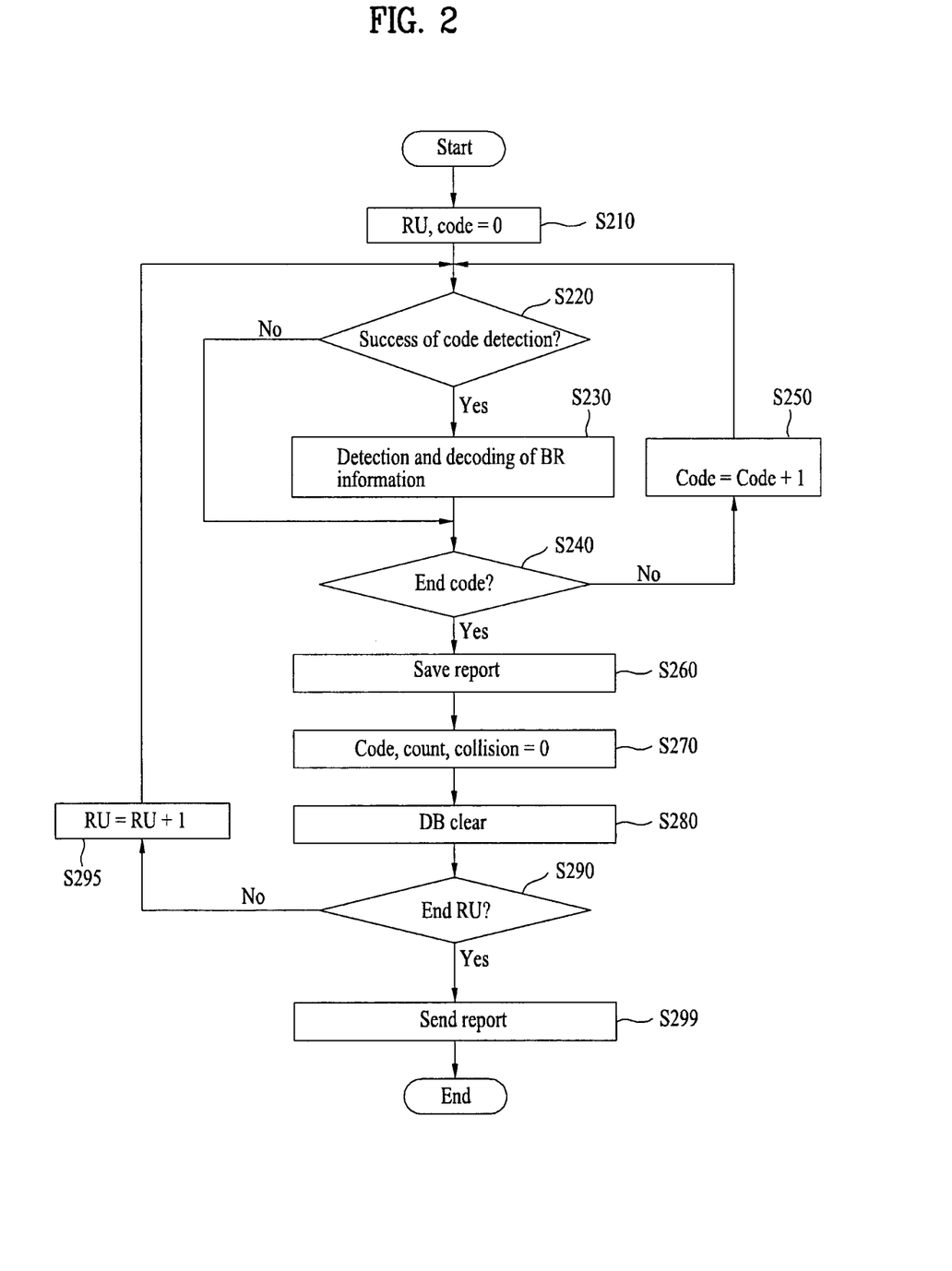
FIG. 2 is a diagram illustrating a procedure of requesting a bandwidth according to one embodiment of the present invention.

FIG. 2 is a diagram illustrating a procedure of requesting a bandwidth according to one embodiment of the present invention.

First of all, a temporary parameter 'RU' for counting a resource unit and a temporary parameter 'code' for scanning a code are initiated ($S_{210}$).

At this time, a temporary parameter 'count' for counting the number of times of success in code detection and a code collision count 'collision' for counting code repetition may be initiated together.

Next, the base station detects a code black box transmitted from mobile stations.

If code detection is successfully performed (S220), the base station decodes bandwidth request (BR) information black box of the detected code (S230). At this time, a value of the temporary parameter 'count' for counting the number of times of success in code detection may be increased as much as 1.

If code detection is failed (S220), the base station advances to next step (S240).

If the temporary parameter 'code' does not indicate the last code to be scanned, the temporary parameter 'code' is increased as much as 1 (S250), and the above steps S220 and S230 are repeated.

Furthermore, the base station saves a report of the black box (S260).

Next, the base station initiates the temporary parameter 'code', the temporary parameter 'count' for counting the number of times of success in code detection, and the code collision count 'collision' for counting code repetition, and also initiates a temporary database (DB) space (S270, S280).

The base station can determine whether all resource units have been scanned (S290). As a result, if it is determined that all resource units have been scanned, the base station sends a report of the saved result to the mobile station (S299).

If it is determined that all resource units have not been scanned, the base station increases the temporary parameter RU as much as 1 to detect a code from next resource unit (S295), and repeats the above steps S220 to 5280. Namely, the above steps are repeatedly performed as much as the number of resource units allocated to transmit a bandwidth request indicator and the number of all available codes.

Figure 3:
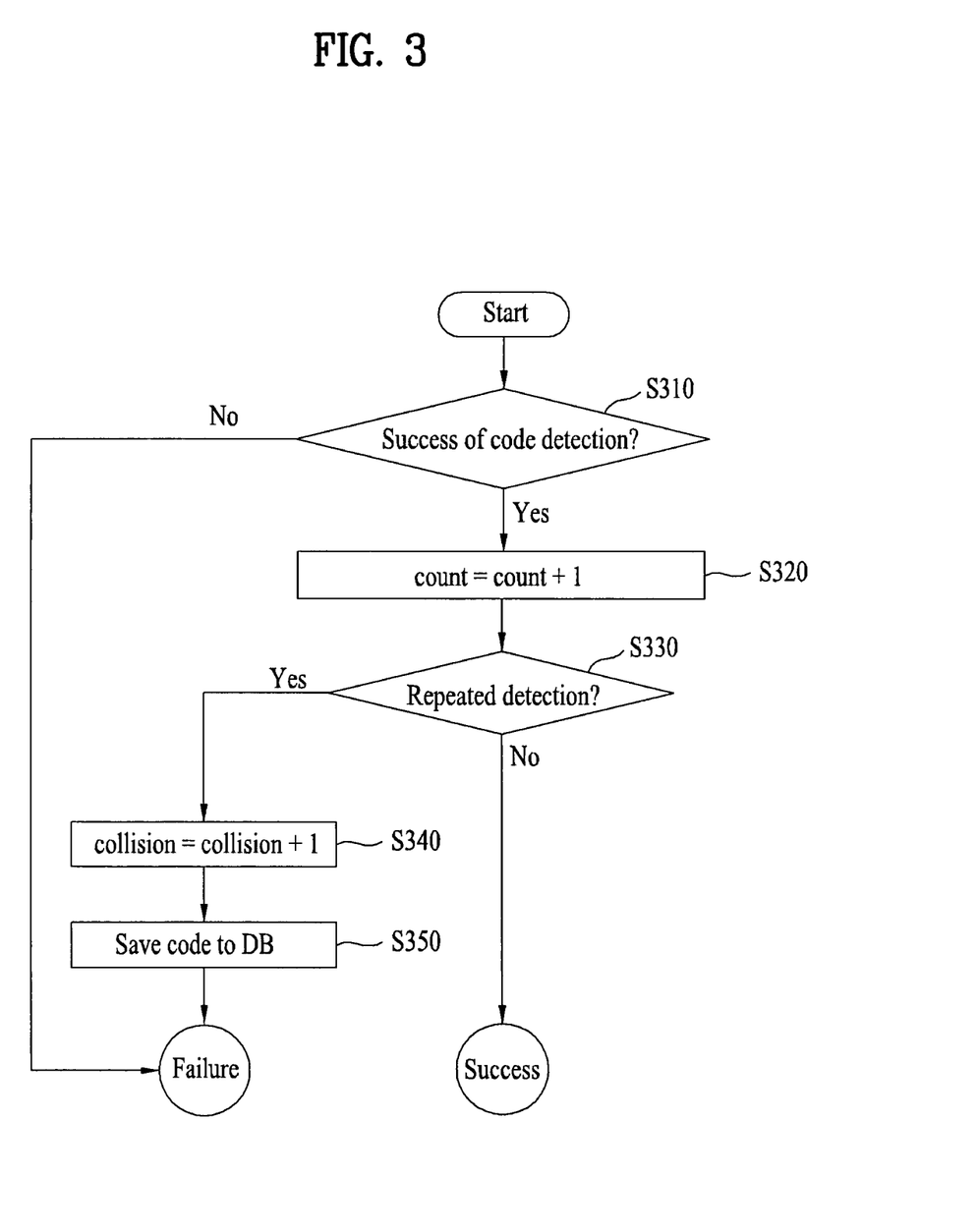
FIG. 3 is a diagram illustrating a detailed procedure of detecting a code in the procedure of FIG. 2.

FIG. 3 is a diagram illustrating a detailed procedure of the step S220 in the bandwidth request procedure of FIG. 2.

First of all, the base station detects codes transmitted from mobile stations. If code detection is successfully performed (S310), the base station increases the temporary parameter 'count' as much as 1 (S320). Meanwhile, if code detection is failed (S310), the base station determines a corresponding code as a failure case.

Meanwhile, the base station determines whether mobile stations have used the repeated code even in the case that code detection is successfully performed (S330). If the mobile stations have not used the repeated code, the base station determines the corresponding code as a success case. On the other hand, if the mobile stations have used the repeated code, the base station increases the code collision count 'collision' as much as 1, saves the corresponding code in its database, and then performs the procedure of the failure case (S340, S350).

Figure 4A:
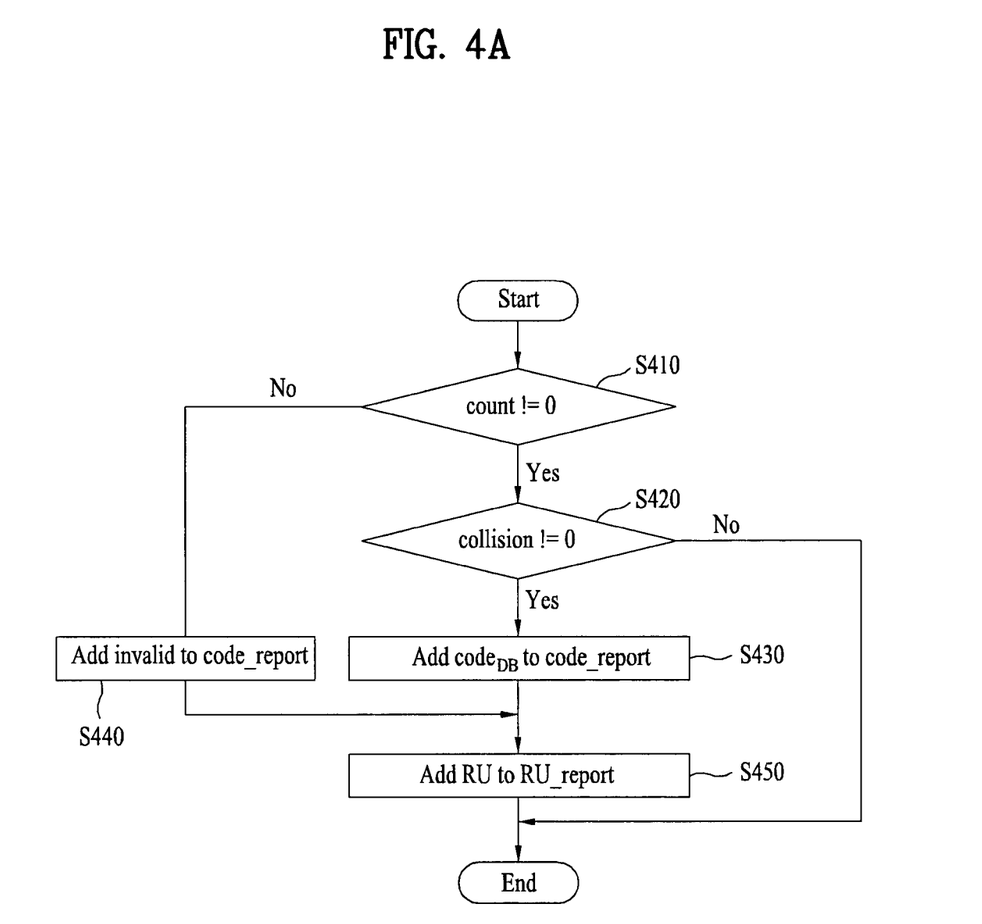
FIG. 4a is a diagram illustrating a detailed procedure of storing a result in the procedure of FIG. 2.

FIG. 4a is a diagram illustrating a detailed procedure of the step S260 in the bandwidth request procedure of FIG. 2.

If the base station fails to detect any code from the corresponding resource unit (S410), the base station adds an invalid value to a code value to be transmitted to the mobile station (S440). If not so (S410), the base station identifies through the code collision count 'collision' whether code collision has occurred (S420). If code collision has occurred, the base station adds collision codes of a temporary database (DB) to the code value to be transmitted to the mobile station (S430). Finally, the base station adds a corresponding resource unit number to a resource unit number value to be transmitted to the mobile station (S450).

Figure 4B:
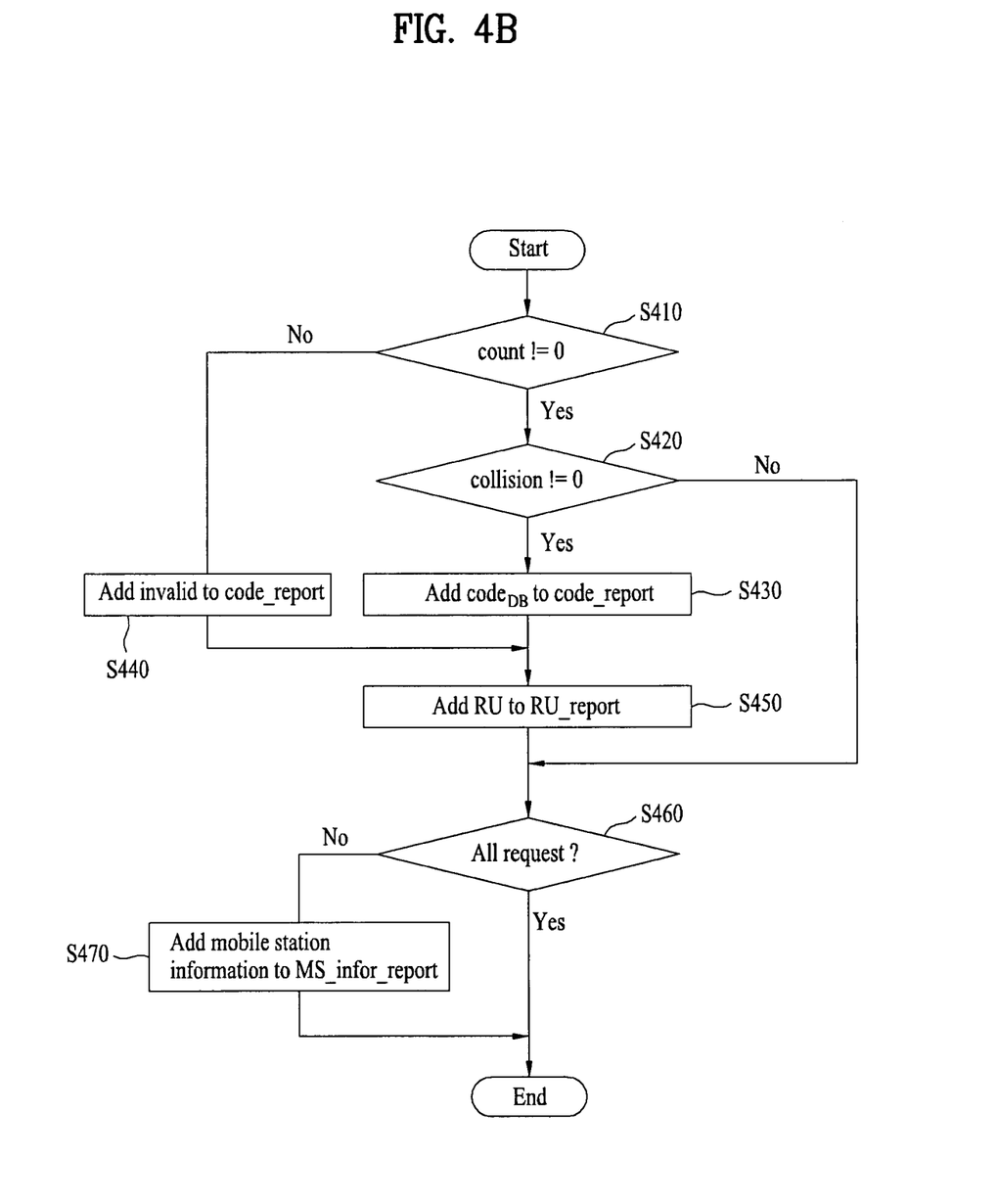

FIG. 4b is a diagram illustrating an example of reporting mobile station information in FIG. 4a.

If the base station fails to detect any code from the corresponding resource unit (S410), the base station adds an invalid value to a code value to be transmitted to the mobile station (S440). If not so (S410), the base station identifies through the code collision count 'collision' whether code collision has occurred (S420). If code collision has occurred, the base station adds collision codes of a temporary database (DB) to the code value to be transmitted to the mobile station (S430). The base station adds a corresponding resource unit number to a resource unit number value to be transmitted to the mobile station (S450).

The base station compares information such as a request time with detected bandwidth request information (MS-ID or STID, grant scheduling type, etc.) in respect of a mobile station having a periodical data transmission flow, so as to detect a request of the corresponding mobile station at the request time.

At this time, if the base station fails to receive any request from the mobile station (S460), the base station saves MS-ID or STID, flow-ID, grant scheduling type, etc. in a result report parameter (S470).

Meanwhile, the base station may report the failure case only or the success case only. Particularly, in order to reduce overhead, the base station can perform the result report of the failure case only.

Figure 5:
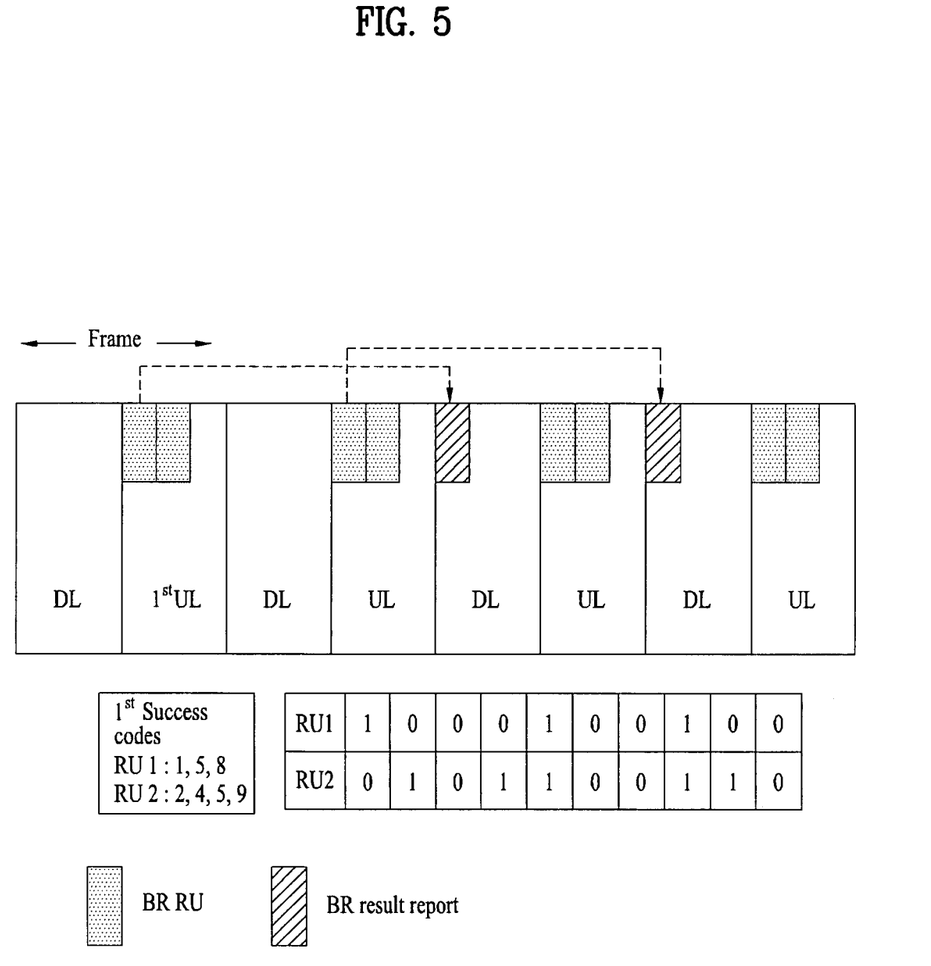
FIG. 5 is a diagram illustrating an example of a result report of a success case according to one embodiment of the present invention.

FIG. 5 is a diagram illustrating an example of a result report of a success case according to one embodiment of the present invention.

Referring to FIG. 5, when the number of bandwidth request resource units (BR RU) allocated for bandwidth request is 2 and the number of codes intended for bandwidth request in the corresponding base station is 10, the result report of the success case (success report or BR result report) is transmitted in a unit of frame.

As the base station transmits code information to each resource unit received normally, in a bitmap type, the mobile station which does not belong to the code information determines that its code has not been transmitted properly. As a result, the mobile station retransmits the bandwidth request. The code information for each resource unit may be transmitted in accordance with a code division multiplexing (CDM) mode, a frequency division multiplexing (FDM) mode, or a time division multiplexing (TDM) mode. Also, the result report may be transmitted in a unit of superframe, frame or subframe.

Figure 6:
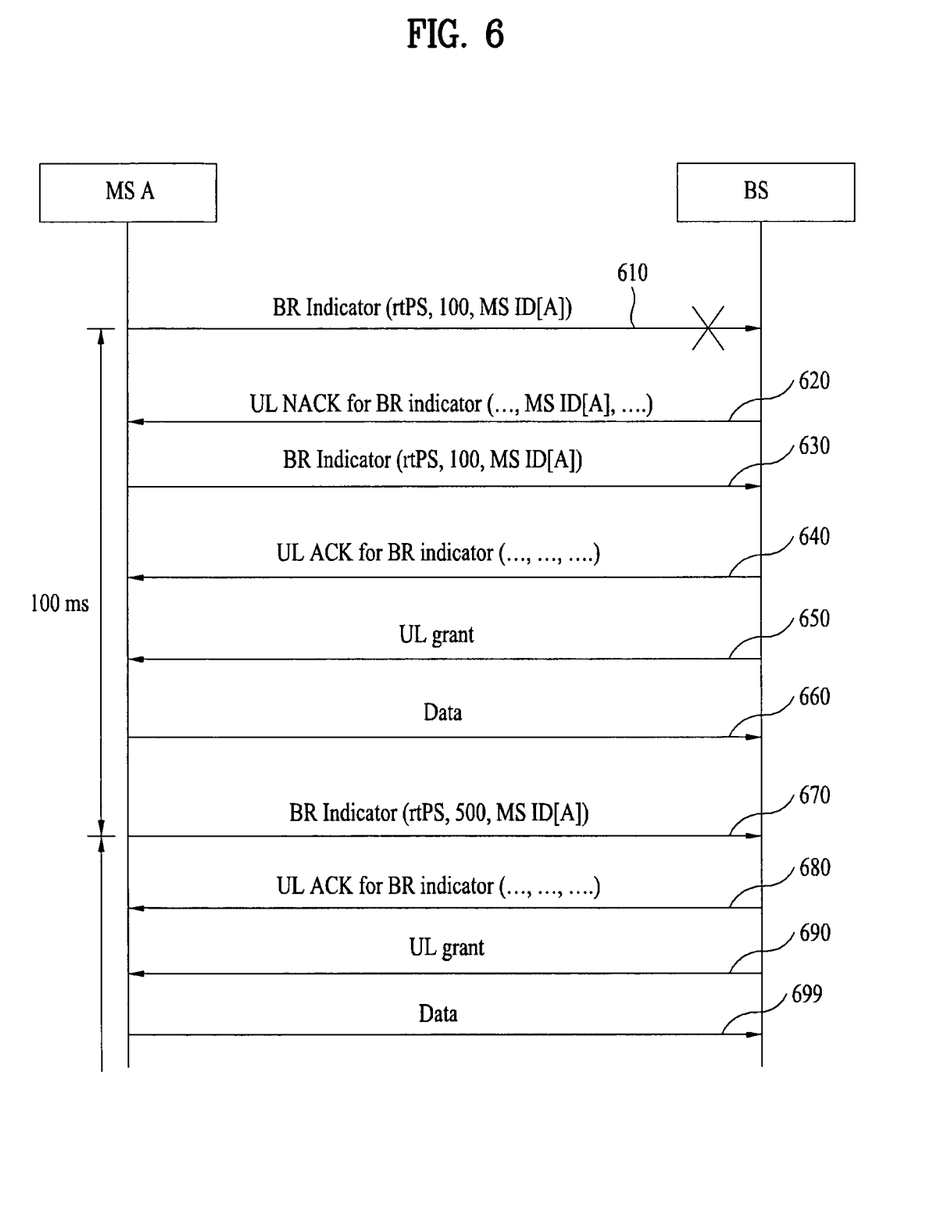
FIG. 6 is a diagram illustrating an example of a result report of a failure case of data transmission having a periodical flow.

FIG. 6 is a diagram illustrating an example of a result report of a failure case of data transmission having a periodical flow.

The mobile station transmits a bandwidth request indicator to the base station to transmit data having rtPS property having a period of 100 ms (610). In the example of FIG. 6, the bandwidth request indicator is not transmitted to the base station properly.

The mobile station is reported from the base station that its bandwidth request indicator has not been received properly (620). In this case, the mobile station retransmits the bandwidth request indicator to the base station (630). Afterwards, the mobile station identifies through an uplink ACK message that the bandwidth request indicator has been received in the base station normally (640).

If the mobile station receives an uplink grant from the base station (650), the mobile station transmits data through an uplink resource indicated by the received uplink grant (660).

The mobile station transmits the bandwidth request indicator per 100 ms (670). The mobile station identifies through the uplink ACK message that the bandwidth request indicator has been received in the base station properly (680). If the mobile station receives an uplink grant from the base station (690), the mobile station transmits data through the resource allocated from the base station (699).

Meanwhile, the mobile station may use a fast feedback channel or piggybacking without transmitting the bandwidth request indicator at the time for bandwidth request. Accordingly, the mobile station notifies the base station that the fast feedback channel or piggybacking is used instead of the bandwidth request indicator, through the existing MAC message (DSC-REQ/RSP) or new MAC message, to allow the base station not to identify whether the bandwidth request indicator has been received at the corresponding time, or to receives the bandwidth request until the report is completed.

Figure 7:
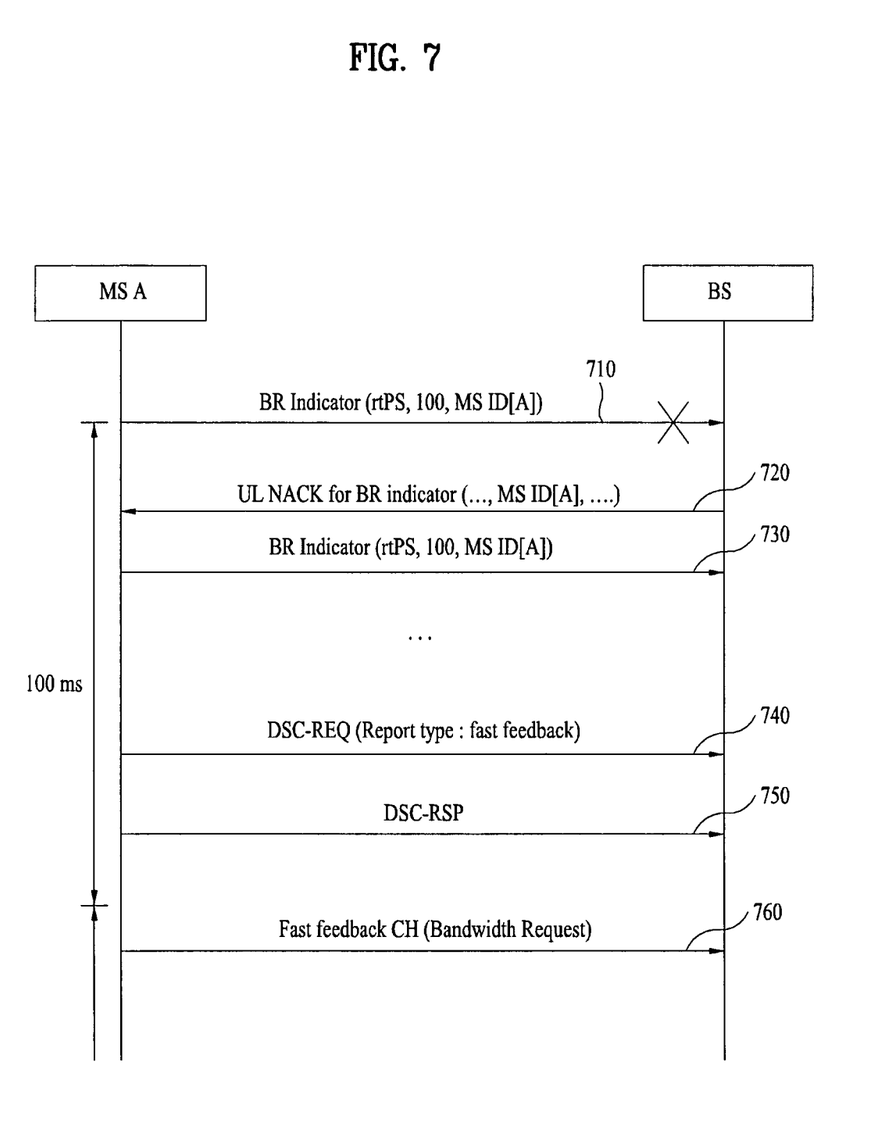
FIG. 7 is a diagram illustrating another example of a result report of a failure case of data transmission having a periodical flow.

FIG. 7 is a diagram illustrating another example of allowing a base station not to report a result of a specific bandwidth request.

The mobile station transmits a bandwidth request indicator to the base station per 100 ms (710). In the example of FIG. 7, the bandwidth request indicator is not transmitted to the base station normally. The mobile station is reported from the base station that its bandwidth request indicator has not been received normally (720). In this case, the mobile station retransmits the bandwidth request indicator to the base station (730).

The mobile station commands through a dynamic service change request (DSC-REQ) message that the base station does not report to the mobile station whether that the bandwidth request indicator has been received or not (740). The base station notifies through a dynamic service change response (DSC-RSP) message that it will not report the result report to the mobile station (750).

Afterwards, if the mobile station requests a bandwidth request through a fast feedback channel (760), the base station does not report the result even if the bandwidth request indicator is not received.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention relates to a method of transmitting a result of an allocation request transmitted to obtain uplink resources. The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A method for a feedback to an uplink allocation request in reporting a result of an uplink allocation request of a mobile station from a base station to the mobile station, the method comprising:

receiving, by the base station, a bandwidth request (BR) periodically from the mobile station, the bandwidth request used by the mobile station to request allocation of channel resources for the mobile station to transmit uplink data periodically to the base station;

detecting, by the base station, a code from the bandwidth request; and transmitting a BR result report from the base station to the mobile station, the BR result report indicating whether the code is detected from the bandwidth request successfully, receiving, by the base station, a dynamic service change request message from the mobile station, the dynamic service change request message used by the mobile station to request the base station not to transmit the BR result report; and transmitting a dynamic service change response message from the base station to the mobile station to inform that the base station will not transmit the BR result report.

2. The method of claim 1, wherein detecting the code comprises decoding information of the bandwidth request if the code is successfully detected from the received bandwidth request.

3. The method of claim 1, wherein detecting the code comprises detecting the code of the received bandwidth request for each resource unit.

4. The method of claim 3, wherein transmitting the BR result report comprises transmitting a code report including codes where the code detection has failed or code repetition has occurred and a resource unit report indicating a resource unit failed in detection.

5. The method of claim 1, wherein the BR result report is included in a message broadcasted to a plurality of mobile stations.

6. A method for receiving a feedback to an uplink allocation request in receiving a result of an uplink allocation request from a base station, the method comprising:

transmitting a bandwidth request (BR) periodically from a mobile station to the base station, the bandwidth request used by the mobile station to request allocation of channel resources for the mobile station to transmit uplink data periodically to the base station;

receiving a BR result report from the base station, the BR result report indicating whether a code is detected from the bandwidth request successfully; and retransmitting the bandwidth request if it is identified from the BR result report that the code of the mobile station is a code that failed in the detection or is a repeated code;

transmitting a dynamic service change request message from the mobile station to the base station to request the base station not to transmit the BR result report; and receiving a dynamic service change response message from the base station, the dynamic service change response message informing that the base station will not transmit the BR result report.

\* \* \* \* \*